United States Patent [19]
Poncelet

[11] 3,904,859
[45] Sept. 9, 1975

[54] METHOD AND APPARATUS FOR MEASURING THE IMPEDANCE OF A LINE

[75] Inventor: Robert Poncelet, Brussel, Belgium

[73] Assignee: Siemens Aktiengesellschaft, Munich, Germany

[22] Filed: Sept. 24, 1973

[21] Appl. No.: 399,845

[30] Foreign Application Priority Data
Sept. 29, 1972 Germany.............................. 2247746

[52] U.S. Cl............. 235/151.31; 235/180; 324/57 R
[51] Int. Cl............................................... G06g 7/34
[58] Field of Search.................. 235/151.3, 31, 180; 324/57 R; 317/23, 27 R

[56] References Cited
UNITED STATES PATENTS

| | | | |
|---|---|---|---|
| 3,599,044 | 8/1971 | Takemura et al................. | 317/27 R |
| 3,673,455 | 6/1972 | Dewey.............................. | 317/27 R |
| 3,731,152 | 5/1973 | Rockefeller, Jr.................. | 317/27 R |

FOREIGN PATENTS OR APPLICATIONS

| | | | |
|---|---|---|---|
| 2,021,772 | 11/1970 | Germany............................ | 235/180 |
| 1,260,618 | 2/1968 | Germany........................... | 324/57 R |

*Primary Examiner*—Felix D. Gruber
*Attorney, Agent, or Firm*—Kenyon & Kenyon Reilly Carr & Chapin

[57] ABSTRACT

A method and apparatus for measuring the impedance of a line in which the resistive and inductive component of line impedance are determined from measured instantaneous values of voltage, current and the rate of current change using a digital computing circuit.

3 Claims, 2 Drawing Figures

METHOD AND APPARATUS FOR MEASURING THE IMPEDANCE OF A LINE

BACKGROUND OF THE INVENTION

This invention relates to measurements of line impedance in general and more particularly to an improved system for measuring such line impedances, which system may be used in protective devices with selective action.

It is essential in devices used for protecting electrical distribution systems to be able to detect a fault occurring in the system as quickly as possible in order that the fault can be disconnected from the system in a short time to keep damage to a minimum. When disconnecting a fault, only the sections of the line containing the fault should be disconnected. That is, selective disconnection of the circuit breaker closest to the fault by opening that circuit breaker should occur. In present system protection devices, analog measuring equipment is generally used. The disadvantage of using such equipment is that, should a fault occur, the resistance of the arc is included in the measurement and the location of the fault cannot be determined accurately. Furthermore, these devices have a reading which suffers from errors caused by the DC transient component which occurs in the case of a short circuit.

Thus, it is clear that there is a need for improved system-protection devices for fault detection which will quickly and selectively isolate a section of line containing the fault.

SUMMARY OF THE INVENTION

The system of the present invention provides a method and means of measuring the line impedance, which impedance may then be used as an input to a comparing device which is used for selective isolation of faults. The present invention permits the fault to be accurately located and quickly isolated. To accomplish this, the method and means of the present invention include measuring the voltage and current along with the current rate of change ($di/dt$) at two points of time or during two time intervals and then using these measured values to solve simultaneous equations to obtain values of the inductance $L$ and the resistance $R$ of the line. Voltages and currents are sensed using voltage and current transformers, the sensed values stored and digitized and then used in a special purpose digital computing arrangement which performs the necessary additions, multiplications, additions and subtractions to obtain values of resistance and inductance.

In the preferred embodiment of the invention, several instantaneous values are measured during first and second time intervals in order to form mean values which more accurately represent the quantities being measured. In such an embodiment, measurements are made at the beginning, middle and end of each time interval. In this embodiment, additional computing hardware is provided to obtain the mean value of voltage current and rate of change of current during the two time intervals.

DETAILED DESCRIPTION OF THE PREFERRED EMBODIMENT

It is well known that the voltage in a circuit containing resistance and inductance may be described by the following equation:

$V = IR + L di/dt$

Each of the quantities, $V$, $I$ and $di/dt$ can be measured and therefore, are the known quantities in the equations. To determine the unknown resistance and inductance components $R$ and $L$ of the line impedance, two simultaneous equations are required. These equations can be equations expressing the above relationship at different points in time when different values of one or more of the known values are present. Thus, two equations may be written as follows:

$V_1 = I_1 R + L \, di_1/dt$ and $V_2 = I_2 R + L di_2/dt$

For purposes of the present disclosure, these two equations may be written as:

$RA + LB = C$ and $RD + LE = F$ where $A$ is the value of the current at a first point in time or during a first time interval; $B$ is the value of the current rate of change at the same time or time interval; $C$ is the value of the voltage at this first time or time interval; $D$ is the value of the current at a second point of time or a second time interval; $E$ is the value of the current rate of change at this second point of time or time interval and $F$ is the voltage value at this second point of time or time interval. Solving the equation for $R$ and $L$ the following is obtained:

$R = [CE - FB]/[AE - DB]$ and $L = [FA - CD]/[AE - DB]$

Figure 1:
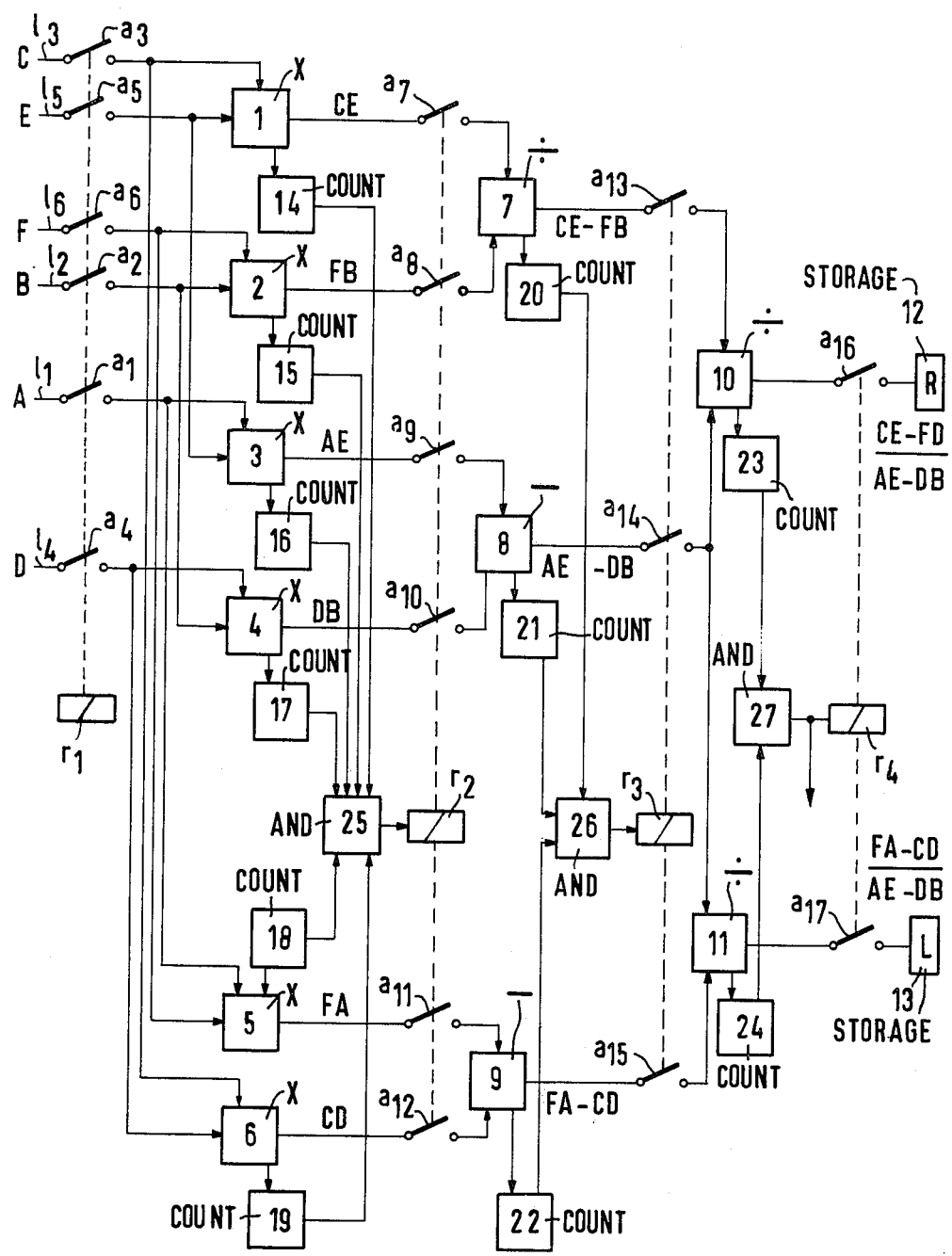
FIG. 1 illustrates in block diagram form a system for computing resistance and inductance from values of voltage, current and rate of change of current measured at two different times or during two different time intervals.

The method and apparatus for obtaining the values $A$, $B$, $C$, $D$, $E$, and $F$ will be described below in connection with FIG. 2. Assume for the moment that these values are available. The circuit of FIG. 1 illustrates in block diagram form how these values may then be used to obtain values representing the resistance and inductance of the circuit which was measured.

Each of the values $A - F$ will be in a digital form. Throughout the explanation only a single line is shown as being associated with each value. It will be understood by those skilled in the art that if parallel arithmetic units are used in each case a plurality of lines, one for each bit may be provided. When operations are done serially, all the bits may be provided on a single line as shown. Also not shown, for purposes of simplicity, are clock lines. It is well known, that digital operations of this nature are normally performed under operations of a clock and that each of the various arithmetic units to be described below would have associated therewith clock inputs. Each of the values $A$ through $F$ is coupled to the circuit of FIG. 1 over lines $1_1$ through $1_6$ respectively and through relay $r_1$ contacts $a_1$ through $a_6$ respectively. Relay $r_1$ is normally open and will be closed only when all of the measured values are present. (In a manner to be described below.) Assuming all the data is present, relay $r_1$ closes all associated contacts and the values $D$ and $E$ are provided to a first multiplier 1. Each of the arithmetic units, i.e., the multipliers, adders and subtractors to be used in the circuits of FIG. 1 can be conventional arithmetic units. Assuming serial arithmetic is being used, the bits of the two quantities $C$ and $E$ will be serially provided into the multiplier 1 under clock control. A counter 14 associated with multiplier 1 keeps track of how many bits have been multiplied and provides an appropriate output when the multiplication is complete. As indicated, the output of multiplier 1 will be a value $CE$. Similarly, in multiplier 2 the bits of the values $F$ and $B$ are multiplied to obtain the value $FB$. Counter 15 associated with multiplier 2 similarly will provide an output upon completion of the multiplication. In multiplier 3 the values $A$ and $E$ are multiplied in similar fashion with the counter 16 providing an output when the multiplication is complete. In like manner, the values $D$ and $B$ are multiplied in multiplier 4 and, the values $F$ and $A$ in multiplier 5 and the values $C$ and $D$ in multiplier 6. The respective counters 17, 18 and 19 associated with these multipliers similarly provide outputs when the multiplication is complete.

Upon completion of all multiplications in multipliers 1 through 6, outputs from each of their respective counters 14 through 19 will be present as inputs to an AND gate 25. AND gate 25 will then have an output to energize a relay $r_2$ having associated therewith the contacts $a_7$ through $a_{12}$. The values $CE$ and $FB$ are provided respectively through contacts $a_7$ and $a_8$ to a subtractor 7 wherein $FB$ is subtracted from $CE$. Subtractor 7 also has associated therewith a counter 20 which provides an output when the subtraction is complete. Similarly, the values $AE$ and $DB$ are provided through the contacts $a_9$ and $a_{10}$ to a subtractor 8 having an associated counter 21. The values $FA$ and $CD$ are provided respectively through contacts $a_{11}$ and $a_{12}$ to subtractor 9 having an associated counter 22. When the subtractions of subtractors 7, 8 and 9 are completed, the associated counters 20, 21 and 22 will each have an output which is an input to AND gate 26. AND gate 26 will now be enabled to energize relay $r_3$ having associated therewith contacts $a_{13}$, $a_{14}$ and $a_{15}$. The value $CE$ minus $FB$ will be provided through contact $a_{13}$ to a divider 10. The second input to divider 10 is the quantity $AE$ minus $DB$ which is provided through contact $a_{14}$ resulting in a divider output of $(CE - FB)/(AE - DB)$. The value $(AE - DB)$ is also provided as one input to a divider 11 which has as its second input the quantity $(FA - CD)$ which is provided through the contact $a_{15}$. Thus, the output of divider 11 will be the value $(FA - CD)/(AE - DB)$. Again, each of the dividers have associated therewith a counter, respectively 23 and 24. These provide two inputs to an AND gate 27 whose output will activate a relay $r_4$ closing contacts $a_{16}$ and $a_{17}$ to permit the values obtained in dividers 10 and 11 to be provided to storage registers 12 and 13 respectively wherein these values of resistance and inductance are then stored, which values may then be used for comparison with known values to determine if and where a fault has occurred.

Figure 2:
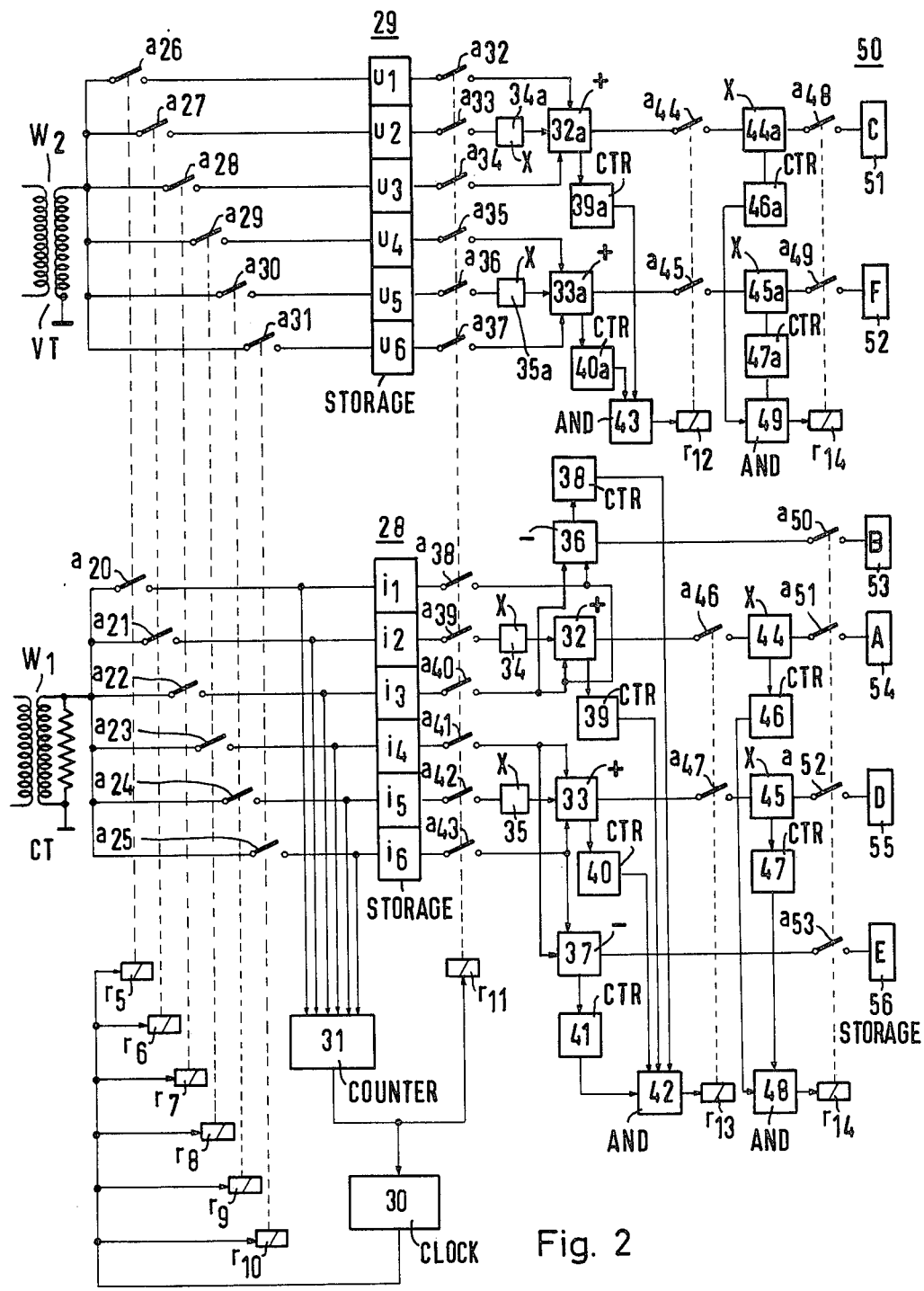
FIG. 2 is a block diagram illustrating a system for measuring, digitizing and averaging data measurements to be used in the system of FIG. 1.

The circuit of FIG. 2 illustrates the manner in which the values of $A$ through $F$ are obtained. A current transformer $W_1$ and a voltage transformer $W_2$ are connected in the line to be measured. Current transformer $W_1$ is coupled through contacts $a_{20}$ through $a_{25}$ to a storage means 28. Similarly, the voltage transformer $W_2$ is coupled to contacts $a_{26}$ through $a_{31}$ to a storage means 29. Each of the storage means 28 and 29 will comprise a plurality of units, one coupled to each of the input lines, which units will store and digitize the measured voltage or current. Typically, such a unit will comprise a sample and hold circuit coupled to an analog to digital converter. The individual units in the storage means 28 will store values designated as $i_1$ through $i_6$ and those in storage unit 29, individual voltage values designated $u_1$ through $u_6$. The contacts at the input are associated with six different relays designated $r_5$ through $r_{10}$. Each relay operates one current and one voltage contact. Thus, relay $r_5$ operates contacts $a_{20}$ and $a_{26}$, relay $r_6$ contacts $a_{21}$ and $a_{27}$ and so on. A clock or oscillator 30 is included which provides appropriate outputs to sequentially energize the six relays in a manner to be described below.

The stored value $u_1 - u_6$ and $i_1 - i_6$ are connected through relay contacts $a_{32}$ through $a_{43}$ to the remainder of the circuit wherein the required values $A$ through $F$ are computed.

In the circuit shown, the values of voltage and current used are mean values. That is, the mean value of voltages $u_1$ to $u_3$ measured during a first time period and the mean value of the voltages $u_4$ through $u_6$ measured during the second time period are found prior to computing the values $A$ through $F$. Similarly, the mean value of the current $i_1$ through $i_3$ and $i_4$ through $i_6$ are also computed. The equation used for computing the mean value $N$ in the circuit of FIG. 2 is as follows:

$N = (T/4)(X_1 + 2X_2 + X_3)$, where T is the time interval over which the mean value is formed, $X_1$ is an instantaneous value of the quantity in question measured at the beginning of the time period, $X_2$ a value measured in the middle of the time period and $X_3$ a value measured at the end of the time interval. Thus, the clock 30 is arranged to sequentially energize relays $r_5$, $r_6$ and $r_7$ during a first time period to thereby obtain three measurements each of voltage and current. Similarly, during the second time period the relays $r_8$, $r_9$ and $r_{10}$ are energized to obtain values of voltage for the second time period. Upon completion of obtaining all data, the data may then be used to compute the mean values and finally mean values used to compute the values $A$ through $F$. A counter 31 has inputs from each of the relay contacts $a_{20}$ through $a_{25}$ and will provide an output after all of the relay contacts have been closed in sequence by the respective relays $r_5$ through $r_{10}$. The output of counter 31 is used to inhibit the clock 30 and to energize a relay $r_{11}$ to close contacts $a_{32}$ through $a_{43}$ to connect the stored values into the computing circuit.

Thus, the values $i_1$ through $i_3$ are coupled by the respective relay contacts $a_{38}$ through $a_{40}$. The values $i_1$ and $i_3$ are provided directly as inputs to an adder 32. The value $i_2$ is first provided to a multiplier 34 wherein it is multiplied by two. In a well known manner, this can be done by shifting, since the multiplication is by a power of two. Coupled to the adder 32 is a counter 39 which will provide an output at the end of the addition operation in the manner described above in connection with FIG. 2. Similarly counters are associated with each of the arithmetic units of the present circuit and each operate in the same manner. After performing its additions, adder 32 will have at its output a quantity equivalent to the quantity shown in brackets in the above equation. In similar fashion, the voltage values $u_1$ through $u_3$, with $u_2$ being multiplied by two in multiplier $34a$, are added in adder $32a$. Counter $39a$ associated therewith provides an output when the addition is complete. The quantities $i_4$ through $i_6$ are similarly provided through the contacts $a_{41}$ through $a_{43}$ to the adder 33 with the quantity $i_5$ being first passed through multiplier 35. Counter 40 provides an output upon completion of the addition. In a similar fashion, the voltage values $u_4$ through $u_6$ are provided to an adder 33a, with the value $u_5$ first being multiplied by two in multiplier 35a. Associated counter 40a provides an output upon completion of the multiplication.

The values $i_1$ and $i_3$ are also provided through their respective contacts $a_{38}$ and $a_{40}$ to a subtractor 36 wherein the quantity $i_3$ minus $i_1$ is computed. This provides a value corresponding to $di/dt$ during the first time interval. Associated counter 38 provides an output upon completion of the subtraction. Similarly, the quantities $i_6$ and $i_4$ are provided through contacts $a_{43}$ and $a_{41}$ to subtractor 37 wherein $i_4$ is substracted from $i_6$ to obtain the $di/dt$ quantity for the second time interval. Associated counter 41 provides an output upon completion of the subtraction. Thus, at the outputs of subtractors 36 and 37 are the quantities $di/dt$ for the first and second time periods respectively. At the output of adder 32 is the sum of currents during the first time period corresponding to the quantity in brackets in the equations above. A similar quantity for the current for the second current period is found at the output of adder 33. At the output of counter 32a is the same quantity for the voltages during the first time period and at the output of counter 33a the same quantity for the voltages measured during the second time period. These four quantities corresponding to the quantities in brackets in the above equation must now be multiplied by (T/4), to obtain the required mean value. Since the time interval is predetermined and fixed, all that is required is a constant multiplication. For purpose of performing this multiplication, the multipliers 44, 45, 44a and 45a are provided. Upon completion of the additions of adders 32 and 33 and the subtractions of subtractors 36 and 37, their associated counters 38, 39, 40 and 41 will all have outputs which are provided as inputs to AND gate 42 causing that gate to have an output to energize relay $r_{13}$. This will close the contacts $a_{46}$ and $a_{47}$ providing the output of adders 32 and 33 to multipliers 44 and 45, respectively, wherein the quantities will be multiplied by (T/4). Thus, the outputs of the multipliers 44 and 45 will correspond respectively to the mean value of current during the first and second time intervals. Counters 46 and 47 associated with multipliers 44 and 45 will provide respective outputs upon completion of the multiplications. These are provided to AND gate 48 which will then have an output energizing relay $r_{15}$. This will close contacts $a_{50}$ through $a_{53}$ and cause the outputs of subtractor 36 ($di/dt$) to be provided to a storage means such as a storage register 53, the output of multiplier 44 ($i_1$) to be provided to a third storage means 55, and the output of subtractor 37 ($di_2/dt$) to be provided to a fourth storage means 56. The storage means on the drawing are labeled according to the letter designations given to the quantities in the simultaneous equations above. In similar fashion, the outputs of adders 32a and 33a respectively are provided through the contact $a_{44}$ and $a_{45}$, in response to the enabling of AND gate 43 by the outputs of counters 39a and 40a, respectively causing the energization of relay $r_{12}$, to the multipliers 44a and 45a. Here, these quantities are similarly multiplied by (T/4). Upon completion of the multiplication the associated counters 46a and 47a will provide inputs to AND gate 49 causing relay $r_{11}$ to be energized closing contacts $a_{48}$ and $a_{49}$. Thus, the new value of voltage during the first time interval, corresponding to the quantity $C$ will be provided to a storage means 51 and the new value of voltage during the second time interval, corresponding to the quantity $F$, will be provided to a second storage means 52. These quantities are now available for use in the circuit of FIG. 1 described above.

As noted above, the ultimate values of resistance and inductance which will be computed and stored in respective registers 12 and 13 will then be used in suitable comparison means to determine a fault location and therefore to determine which line sections must be disconnected. It will be recognized that the six measurements (more or less measurements may be used) and the required computations can be accomplished in a very short period of time using the high speed digital computing hardware. Thus, these measurements and computations can easily be made within the time period during which a fault must be detected. The system provides extremely accurate values for the resistive and inductive components of the line impedance thereby permitting accurate location of the fault and preventing erroneous tripping of circuit breakers. The inductive component $L$ of the line impedance is used as a measure of the distance between the location of the fault and the point of measurement. The resistive component $R$ may be used to determine a given tripping characteristic of the system protection device and the hunting processes which occur in normal operations can clearly be distinguished from faults.

Thus, an improved method and apparatus for measuring line impedance for use in system protection devices has been shown. Although specific embodiments have been illustrated and described, it will be obvious to those skilled in the art that various modifications may be made without departing from the spirit of the invention which is intended to be limited solely by the appended claims.

What is claimed is:

1. Apparatus for automatically measuring the impedance of a line in an electrical circuit for use in operating a system protective device said apparatus carrying out the steps of:
   a. sampling and storing the line voltage during a first time interval to obtain a first value proportional to the voltage;
   b. sampling and storing a plurality of instantaneous values of the line current during said first time interval and storing said values;
   c. computing from said plurality of stored instantaneous values a mean value which is a second value proportional to the mean current;
   d. computing from said plurality of stored instantaneous values, a first current rate of change for said first time interval to obtain a third value;
   e. sampling and storing the line voltages during a second time interval to obtain a fourth value proportional to the voltage;
   f. sampling and storing a plurality of instantaneous values of line current during said second time interval;
   g. computing from said plurality of instantaneous values a fifth value proportional to the mean current during said second time interval;
   h. computing from said plurality of values, a second current rate of change to obtain a sixth value;
   i. multiplying said first value by said sixth value in a first multiplier to obtain a first product;

j. multiplying said fourth value by said third value in a second multiplier to obtain a second product;
k. subtracting said second product from said first product in a first subtractor to obtain a first intermediate value;
l. multiplying said second value by said sixth value in a third multiplier to obtain a third product;
m. multiplying said fifth value by said third value in a fourth multiplier to obtain a fourth product;
n. subtracting said fourth product from said third product in a second subtractor to obtain a second intermediate value;
o. dividing in a first divider said first intermediate value by said second intermediate value whereby the value obtained will be a value corresponding to the resistive component of the line impedance;
p. multiplying in a fifth multiplier said second voltage by said first current to obtain a fifth product;
q. multiplying in a sixth multiplier said first voltage by said second current to obtain a sixth product;
r. subtracting said sixth product from said fifth product to obtain a third intermediate value; and
s. dividing said third intermediate value by said second intermediate value in a second divider to obtain a quantity representing the inductive components of the line impedance.

2. Apparatus for computing the impedance of a line for use in a system protective device comprising:
a. means for providing a first output signal proportional to the line voltage;
b. means for providing a second output signal proportional to the line current;
c. first means for sampling and storing said first output signal at first time interval;
d. second means for sampling and storing a plurality of instantaneous values of said second output signal during said first time interval;
e. first means for computing a mean current from said plurality of instantaneous values;
f. second means for computing from said instantaneous values a first current rate of change corresponding to the current rate of change during said first time interval;
g. third means for sampling and storing said first output signal at a second time interval;
h. fourth means for sampling and storing a plurality of instantaneous values of said second output signal during said second time interval;
i. third means for computing from said plurality of instantaneous values a mean value of current during said second time interval;
j. fourth means for computing from said plurality of instantaneous values the current of rate change during said second time interval;
k. means to sequentially operate said first, second, third and fourth means for sampling and storing and said first, second, third and fourth computing means;
l. a first multiplier having as inputs the output of said fourth means for sampling and storing and said fourth means for computing and providing as an output a first product;
m. a second multiplier having as inputs the output of said third means for sampling and storing and said second means for computing and providing as an output a second product;
n. a third multiplier having as inputs the output of said third means for sampling and storing and said fourth means for computing and providing as an output a third product;
o. a fourth multiplier having as inputs the output of said third means for computing and said second means for computing and providing as an output a fourth product;
p. a fifth multiplier having as inputs the output of said third means for sampling and storing and the output of said first means for computing and providing as an output a fifth product;
q. a sixth multiplier having as inputs the output of said first means for sampling and storing and the output of said third means for computing and providing as an output a sixth product;
r. a first substractor having as inputs said first and second products and providing as an output the difference therebetween as a first intermediate value;
s. a second substractor having as inputs said third and fourth products and providing the difference therebetween as a second intermediate value;
t. a third subtractor having as inputs said fifth and sixth products and providing as a third intermediate value the difference therebetween;
u. a first divider having as inputs said third intermediate value and said first intermediate value and providing as an output said first intermediate value divided by said third intermediate value, said output representing the resistive component of line impedance;
v. a second divider having as inputs said third intermediate value and said second intermediate value and providing an output which is said second intermediate value divided by said third intermediate value, said output representing the inductive component of said line impedance;
w. first storage means coupled to the output of said first dividing means for storing said resistive component; and
x. second storage means coupled to the output of said second dividing means for storing said inductive component.

3. The circuit according to claim 2 wherein:
a. said means for providing a first output signal comprises a voltage transformer;
b. said means for providing a second output signal comprises a current transformer;
c. said first means for sampling and storing comprises:
   1. first, second and third voltage storing means;
   2. a first adder;
   3. a seventh multiplier having its output coupled as one input to said first adder;
   4. means coupling said first and third voltage storage means to said first adder and said second voltage storage means to said seventh multiplier;
   5. an eighth multiplier having the output of said first adder as an input;
   6. first output storage means; and
   7. means coupling the output of said eighth multiplier to said first output storage means;
d. said second means for sampling and storing comprises first, second and third current storage means;
e. said third means for sampling and storing comprises:

1. fourth, fifth and sixth voltage storage means;
2. a second adder;
3. a ninth multiplier having its output coupled as one input to said first adder;
4. means coupling said fourth and sixth voltage storage means to said first adder and said second voltage means to said ninth multiplier;
5. a tenth multiplier having the output of said second adder as an input;
6. second output storage means; and
7. means coupling the output of said tenth multiplier to said second output storage means;

f. said fourth means for sampling and storing comprises fourth, fifth and sixth current storage means;

g. said means to sequentially operate said first, second, third and fourth means comprises means for sequentially coupling said voltage and current transformer to the respective ones of said voltage and current storage means at uniform time intervals;

h. said first means for computing comprises:
  1. a third adder;
  2. a eleventh multiplier having its output provided as one input to said third adder;
  3. means coupling said first and third current storage means to said third adder and said second current storage means to said eleventh multiplier;
  4. a twelfth multiplier having the output of said third adder is an input;
  5. third output storage means; and
  6. means coupling the output of said twelfth multiplier to said third output storage means, i. said second means for computing comprises:
  1. a fourth substractor having as input the outputs of said first and third current storage means,
  2. a fourth output storage means; and
  3. means coupling the output of said fourth subtractor to said fourth output storage means;

j. said third means for computing comprises:
  1. a fourth adder;
  2. a thirteenth multiplier having its output provided as one input to said fourth adder;
  3. means coupling said fourth and sixth current storage means to said fourth adder;
  4. a fourteenth multiplier having the output of said third adder is an input;
  5. fifth output storage means; and
  6. means coupling the output of said fourteenth multiplier to said fifth output storage means; and k. said fourth means for computing comprise:
  1. a fifth subtractor having as inputs the outputs of said fourth and sixth current storage means;
  2. a sixth output storage means; and
  3. means coupling the output of said fifth subtractor to said sixth output storage means.

* * * * *